United States Patent [19]

Okuda

[11] 4,170,726
[45] Oct. 9, 1979

[54] METHOD OF WORKING OUTER PERIPHERY OF ARTICLES WITH LASER LIGHT

[75] Inventor: Hiroji Okuda, Kitakatsuragigun, Japan

[73] Assignee: Koyo Seiko Company Limited, Osaka, Japan

[21] Appl. No.: 870,996

[22] Filed: Jan. 20, 1978

[30] Foreign Application Priority Data

Nov. 15, 1977 [JP] Japan ................................ 52-137391

[51] Int. Cl.² ............................................... B23K 9/00
[52] U.S. Cl. ............................................ 219/121 LM
[58] Field of Search ............. 219/121 L, 121 LM, 62, 219/121 EB, 121 EM, 68

[56] References Cited

U.S. PATENT DOCUMENTS

| 2,861,166 | 11/1958 | Cargill | 219/68 |
| 3,862,391 | 1/1975 | Blomgren | 219/68 |

*Primary Examiner*—J. V. Truhe
*Assistant Examiner*—Fred E. Bell
*Attorney, Agent, or Firm*—Mason, Fenwick & Lawrence

[57] ABSTRACT

A laser beam is applied to a rotating workpiece tangentially of the path of rotation thereof with a suitable tolerance while the light is being shifted relative to the workpiece, whereby the irradiated portion of the workpiece is melted and the molten material is removed by removing means for shaping. This method forms an annular groove in part of the outer periphery of the workpiece or a smooth surface or indentations of specified depth in the outer periphery over a wide area.

4 Claims, 6 Drawing Figures

METHOD OF WORKING OUTER PERIPHERY OF ARTICLES WITH LASER LIGHT

BACKGROUND OF THE INVENTION

This invention relates to a novel method of working the outer periphery of circular or polygonal articles with a laser beam.

Techniques have heretofore been developed for welding, cutting or drilling workpieces with laser light as disclosed in U.S. Pat. Nos. 2,989,614 and 3,301,949. However, these techniques in which a laser beam is applied to the surface of the workpiece perpendicularly thereof are unable to form a desired smooth surface or indentations of specified depth in the outer periphery of the workpiece over a wide area or to form an annular groove of desired shape in the periphery of the workpiece. It is also well known to mechanically machine or grind the outer periphery of a rotating workpiece, but this method not infrequently involves difficulties, is inefficient or requires an apparatus of large capacity. For example, when machining the outer periphery of a rolling roll to a smooth surface for correction, the conventional mechanical machining method requires a large-scale apparatus and therefore involves the necessity of removing the roll from the rolling mill before machining. Further in machining the outer periphery of a bolt head, nut or like workpiece having a polygonal outer periphery, the workpiece is cut first at the corner portions with use of a tool while the workpiece is being driven at a specified speed, thus subjecting the tool to great resistance and impact which cause damage to and wear on the tool and presenting difficulty in machining or resulting in a reduced operation efficiency. In fact, a method remains yet to be provided by which the outer periphery of workpieces can be machined free of these problems, with improved efficiency and by the use of simple equipment.

SUMMARY OF THE INVENTION

An object of this invention is to provide a method of working the outer periphery of workpieces with ease in which, unlike the conventional methods wherein the workpiece is irradiated with a laser beam perpendicularly to the surface thereof, a laser beam is applied to the outer periphery of the workpiece tangentially thereof while the workpiece is being rotated, the invention thus assuring a wider range of applications of a laser beam for machining purposes.

Another object of this invention is to provide a method of the type described in which the point of irradiation of the workpiece with the a laser beam is shifted in the direction of the axis of rotation of the workpiece to easily form a smooth outer peripheral surface of uniform radius if the workpiece is circular or remove the corners if the workpiece is polygonal, the method having the advantage that a rolling roll, for example, can be worked on the surface for correction with ease without being detached from the rolling mill.

Another object of this invention is to provide a method of accurately forming annular grooves in the outer periphery of workpieces, in which the workpiece in rotation is irradiated with a laser beam tangentially of the path of rotation of its outer periphery, with the point of irradiation continuously shifted in the direction of the axis of rotation of workpiece and also toward the center of rotation thereof so as to form a groove of desired dimensions and shape in section. The material melted with the laser beam within the annular groove is removed by a shaping tool. The shaping tool follows the point of irradiation for the removal of the melt. This method is well suited to the formation of annular grooves in circular workpieces, especially advantageously in bolt heads, nuts or like articles having a polygonal periphery which are difficult to efficienctly machine by usual mechanical means such as a cutting tool.

Another object of this invention is to provide a method of accurately forming projections or indentations on the outer periphery of workpieces over a wide area, in which the point where the workpiece is irradiated with a laser beam is shifted in the direction of the axis of rotation of the workpiece and also toward the center of rotation thereof in the same manner as above. In this case the point of irradiation is shifted over a wider range in the direction of the axis of rotation.

Another object of this invention is to shape the outer periphery of workpieces to the desired configuration in a continuous fashion through a single procedure while measuring the outer peripheral configuration of the workpiece by a non-contact type laser measuring device without interrupting the operation of the shaping apparatus or without adversely affecting the resulting configuration.

Still another object of this invention is to automatically work articles with high precision and high efficiency by completely controlling, throughout the entire operation, the positions of the point of irradiation with a laser beam, the point of removal of the melt and the point where the configuration of the workpiece is measured.

The main features of this invention are defined in the appended claims. Other features of this invention will become apparent from the following description with reference to the accompanying drawings.

DESCRIPTION OF THE PREFERRED EMBODIMENTS

Figure 1:
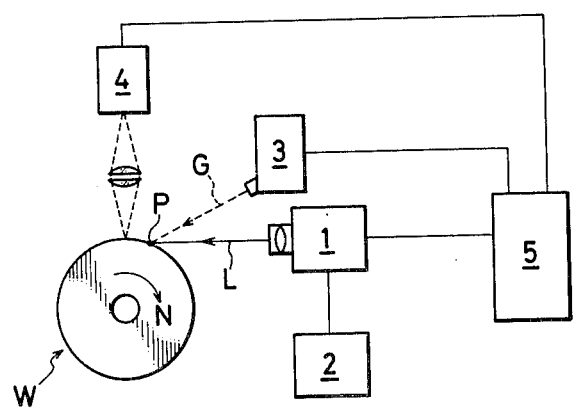
FIG. 1 is a diagram showing an embodiment of this invention.
Figure 2:
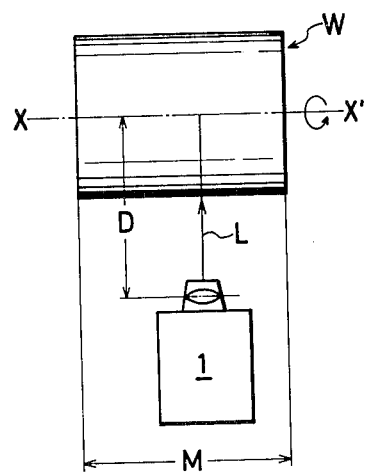
FIG. 2 is a diagram showing the relation between a circular workpiece and a laser beam applicator as they are shifted relative to each other.

FIGS. 1 and 2 show an embodiment of this invention. Indicated at W is a circular workpiece, at 1 a laser beam applicator, at 2 a laser beam generator, at 3 a gas generator, at 4 a monitor or surface inspecting means, and at 5 control means for controlling the devices 1 to 4 respectively. The workpiece W is rotated in the direction of the arrow N at a specified speed. The laser beam L produced by the generator 1 is applied to the workpiece W substantially tangentially of the circular path of rotation of the workpiece with a predetermined tolerance. During the irradiation, the laser beam applicator 1 is maintained at a constant distance D from the workpiece W and is moved in the direction of the axis X-X' of rotation of the workpiece W over the distance corresponding to the width M of its outer periphery, whereby the entire outer peripheral surface of the circular workpiece W is worked by being melted. The laser beam applicator 1 is moved in parallel to the axis X-X' by a suitable feeder at a predetermined speed controlled by the control means 5. The irradiation of the outer periphery of the workpiece W with the laser beam L melts the material on the periphery, scattering molten particles over the surface. For an efficient and accurate operation, the molten particles are removed for example by a gas generator 3 from which a jet of oxygen, argon, air or like gas G is applied to the molten portion of the outer periphery in the same direction as the laser beam L or in a suitable direction. The depth to which the outer periphery is to be worked and the accuracy of the operation are adjustable by the monitor or surface inspecting means 4, with the results of the inspection fed back to the control means 5. Although the laser beam applicator 1 has been described above as being movable axially of the workpiece W by the width M of the outer periphery for the working of the entire peripheral surface of the workpiece W, the applicator 1 may alternatively be placed in a fixed position with the circular workpiece W moved axially thereof while rotating. The circular workpiece W, when rotating in a fixed position, may further be irradiated with a laser beam which is being shifted axially of the workpiece by an optical reflection system and an optical condenser system which are moving. The relation between the speed of rotation, n, of the circular workpiece W and the speed of movement, v, of the workpiece W in the direction of the axis X-X' of its rotation is defined by $s/(\pi d) \geq n \geq v/(\Delta w)$ where s is working speed (mm/min), d is the diameter of the outer periphery of the workpiece W, and $\Delta w$ is the width of working by the laser beam L. Accordingly the speeds n and v are determined based on this relation as well as other factors such as the output of the laser beam L and depth of melting. The irradiation distance D is determined in view of the output of the laser beam L, the depth of melting, etc.

Figure 3:
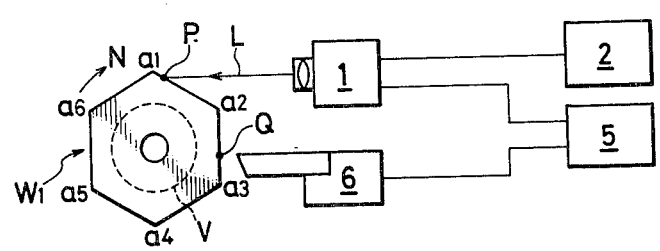
FIG. 3 is a diagram showing another embodiment of this invention.
Figure 4A:
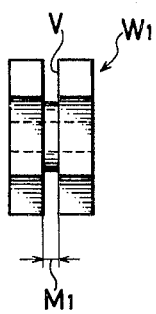
FIGS. 4 (A), (B) and (C) are side elevations showing examples of polygonal workpieces with a groove formed therein by the method shown in FIG. 3.
Figure 4B:
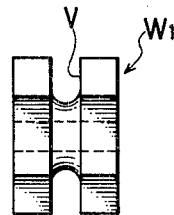
Figure 4C:
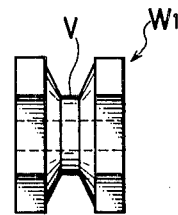

FIGS. 3 and 4 show another embodiment of this invention. FIG. 3 shows a laser beam applicator 1, a laser light generator 2, control means 5 and a tool 6 serving as shaping means for removing the molten material. An annular groove of specified shape will be formed in the outer periphery of a polygonal workpiece $W_1$, such as a bolt head or nut, in the following manner by the illustrated system. The polygonal workpiece $W_1$ is rotated at a predetermined speed for example in the direction of the arrow N. The laser beam applicator 1 is positioned beside the workpiece $W_1$ to apply a laser beam L to the workpiece substantially tangentially of the circular path of rotation of the workpiece. The laser beam L is applied to the workpiece $W_1$ to cut off the corners $a_1, a_2, \ldots a_6$ of the workpiece $W_1$ first over the width $M_1$ of a groove V. After the removal of the corners $a_1, a_2, \ldots a_6$, the shaping tool 6 advances to remove the melt resulting from the irradiation. The shaping tool 6 is used in place of the foregoing gas generator 3 which is unable to remove the melt from the narrow and deep groove V with a jet of gas G. The shaping tool 6 for the removal of the melt, when having a cutting function, gives to the worked portion the surface roughness and dimensional accuracy desired for finishing. The laser beam applicator 1 and the tool 6 for shaping by removing the melt are moved by control means 5 so that the point of irradiation, P, and the point Q where the tool 6 contacts the workpiece $W_1$ for the removal of the melt are shifted in the direction of the axis of rotation of the workpiece $W_1$ and toward the center of its rotation to form the groove V of the desired shape. Although a method has been described of forming a groove in a polygonal workpiece, the method is similarly a applicable to circular workpieces with greater ease. Furthermore, the laser beam applicator 1 and the melt removing tool 6, when moved axially of the workpiece over a wider range, form continuous or discrete projections or indentations on the outer periphery of the workpiece over a wider area. It is also possible to apply the laser beam L to the surface of the polygonal workpiece $W_1$ to reduce the hardness of the surface to be worked and to cut the surface with a cutting tool.

Figure 5:
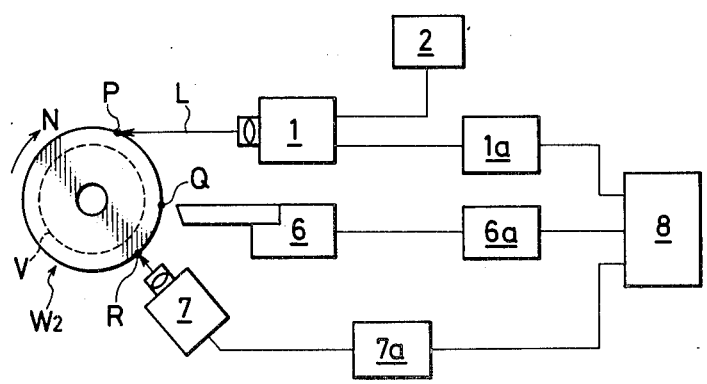
FIG. 5 is a diagram showing another embodiment of this invention.
Figure 6A:
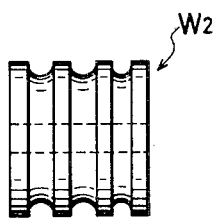
FIGS. 6 (A), 6 (B) and 6 (C) are side elevations showing examples of workpieces having projections or indentations formed in the outer periphery by the method illustrated in FIG. 5.
Figure 6B:
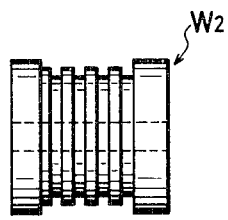
Figure 6C:
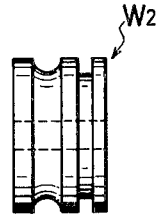

FIGS. 5 and 6 show another embodiment of this invention. FIG. 5 shows a laser beam applicator 1, following means 1a for the applicator 1, a laser beam generator 2, a tool 6 serving as means for removing a melt and shaping, following means 6a for the tool 6, non-contact type laser configuration measuring means 7, following means 7a for the measuring means 7, and numerical control means 8 with use of a computer. The illustrated system accurately forms continuous or discrete projections or indentations on the outer periphery of a circular workpiece $W_2$ over a wide area in the following manner. The laser beam applicator 1 is set in position so that the workpiece $W_2$ rotating in the direction of the arrow N at a specified speed will be irradiated with laser light L tangentially thereof with a suitable tolerance. The melt removing tool 6 and the configuration measuring means 7 are so arranged that the point Q where the tool 6 contacts the workpiece for the removal of the melt and the measuring point R for the measuring means 7 will be suitably spaced apart from the point of irradiation, P, on a circumferential line on which the laser beam L irradiates the workpiece. The laser beam applicator 1 and the tool 6 are operated at the same time in response to the instructions from the numerical control means 8 by way of the following means 1a and 6a. If the workpiece is polygonal, the melt removing tool 6 is initiated into operation with delayed timing after the laser beam applicator 1 has been actuated. The state of the workpiece worked with the laser beam L and the tool 6 is measured by the measuring means 7 under the control of the numerical control means 8 by way of the following means 7a, and the results are given to the numerical control means 8. The control means 8 processes the information received and gives instructions to the laser beam applicator 1 and the melt removing tool 6 via the following means 1a and 6a to accurately control the positions of the irradiation point P and contact point Q from moment to moment. Thus the laser beam applicator 1, the melt removing tool 6 and the measuring means 7 are shifted over a wide range under the control of the control means 8, with the irradiation point P, contact point Q and measuring point R maintained in accurate positions at all times with respect to the direction of the axis of rotation of the workpiece $W_2$ and the radial direction thereof, whereby indentations can be formed in the outer periphery of the circular workpiece $W_2$ over a wide area with high precision.

What is claimed is:

1. A method of working the outer periphery of a workpiece using laser beam, comprising the steps of:
   rotating a workpiece;
   irradiating the workpiece at a point of irradiation with a laser beam oriented tangential to the workpiece to effect melting the workpiece in the area of irradiation,
   removing the melt, and
   shifting the point of irradiation in the direction of the axis of rotation of the workpiece.

2. A method as defined in claim 1 including the step of moving the point of irradiation inwardly toward the center of the rotation of the workpiece.

3. A method as defined in claim 1 wherein the step of removing the melt is effected by the application of a jet of gas thereto.

4. A method as defined in claim 1 wherein the step of removing the melt is effected by engaging the melt with a shaping tool.

* * * * *

Disclaimer

4,170,726.—*Hiroji Okuda,* Kitakatsuragigun, Japan. METHOD OF WORKING OUTER PERIPHERY OF ARTICLES WITH LASER LIGHT. Patent dated Oct. 9, 1979. Disclaimer filed Dec. 21, 1982, by the assignee, *Koyo Seiko Co. Ltd.*

Hereby enters this disclaimer to claims 1, 2 and 3 of said patent.

[*Official Gazette March 15, 1983.*]